C. WATERMAN.
Domestic Boiler.

No. 96,518.

Patented Nov. 2, 1869.

Witnesses
Jas. M. Chadsey
Harry Coleman.

Inventor
Cyrus Waterman
By Wm. C. Wood
atty

United States Patent Office.

CYRUS WATERMAN, OF PROVIDENCE, RHODE ISLAND.

Letters Patent No. 96,518, dated November 2, 1869.

STEAM CULINARY VESSEL.

The Schedule referred to in these Letters Patent and making part of the same

*To all whom it may concern:*

Be it known that I, CYRUS WATERMAN, of the city and county of Providence, and State of Rhode Island, have invented a certain new and useful Steam Culinary Vessel.

My invention consists in the combination of an inner close-covered vessel, with an outer one also provided with a cover, and arranged for use, in connection with the ordinary so-called "tea-kettle," or water-boiler, the whole forming an economical, effective, and desirable article of kitchen-furniture; and I do hereby declare that the following specification, taken in connection with the drawings furnished, and forming a part of the same, is a clear and correct description thereof.

Figure 1:
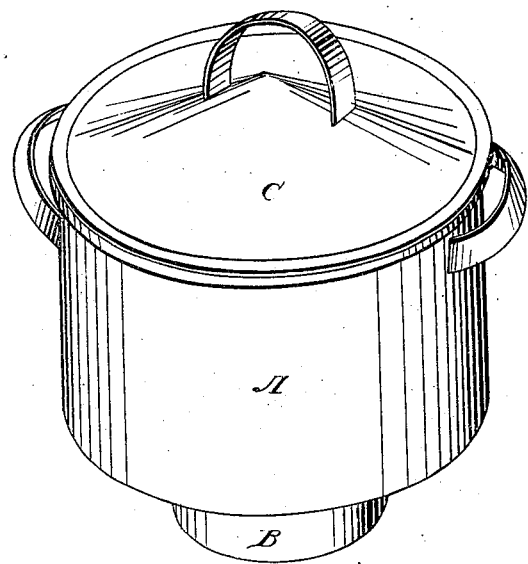

Figure 1 represents one of my improved vessels in perspective.

A is the outer vessel.

B, that portion of the same which is made to enter the kettle or boiler, with which it is to be used.

Within the part B, the bottom of the vessel is perforated, or it may be left entirely open.

C is the cover, made to fit so as to retain as much of the rising steam as posible.

Figure 2:
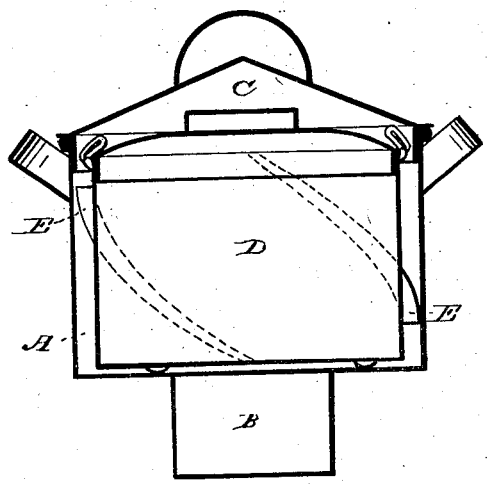

Figure 2 represents the same in vertical section, and parts are lettered, as in fig. 1.

D represents an inner vessel, with a cover fitting as tightly as possible, with the ordinary slide-cover joint. Upon its outer periphery, extending from bottom to the top, are flanges, arranged spirally, so as to fill, as far as possible, the space between the vessels, for the purpose of subjecting the inner vessel to the greatest possible degree of heat from the rising steam.

Figure 3:
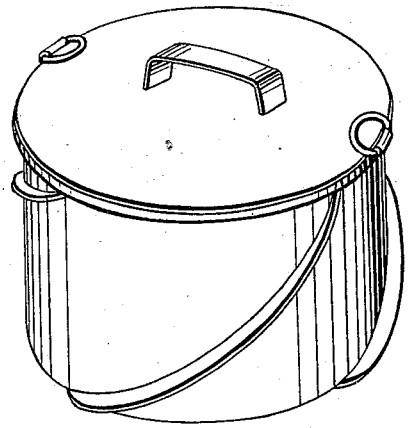

Figure 3 represents the vessel D in perspective, and exhibits more fully the flanges referred to, marked E.

The mode of using my vessel is sufficiently explained by the description.

I am aware that a great variety of steaming culinary vessels have heretofore been constructed; but I am not aware that any have, before my invention, been made, which, while being adapted for common and general use, can also be used in connection with the ordinary tea-kettle or water-boiler, and perform the operation of cooking without having the steam directly in contact with the food, and precluding, thereby, the possibility of tainting the water in the kettle during the process.

I therefore claim, as a new article of manufacture—

The arrangement and combination of the steam-chamber A, provided with the downward-projecting flange B, and partially-perforated bottom, with the close-covered inner vessel D, when all the parts are constructed so as to operate as described.

CYRUS WATERMAN.

Witnesses:
THOS. A. MILLETT,
CHARLES SELDEN.